(12) United States Patent
Burton

(10) Patent No.: US 10,315,558 B2
(45) Date of Patent: Jun. 11, 2019

(54) LOCKING POSITION STUD FASTENER FOR A VEHICLE LAMP ASSEMBLY

(71) Applicant: Burton Technologies, LLC, Ludington, MI (US)

(72) Inventor: John Edwards Burton, Ludington, MI (US)

(73) Assignee: Burton Technologies, LLC, Ludington, MI (US)

( * ) Notice: Subject to any disclaimer, the term of this patent is extended or adjusted under 35 U.S.C. 154(b) by 35 days.

(21) Appl. No.: 14/608,668

(22) Filed: Jan. 29, 2015

(65) Prior Publication Data

US 2015/0139750 A1    May 21, 2015

Related U.S. Application Data

(63) Continuation-in-part of application No. 13/696,610, filed as application No. PCT/US2011/037760 on May 24, 2011, now Pat. No. 9,382,931.

(60) Provisional application No. 61/347,668, filed on May 24, 2010, provisional application No. 61/379,613, filed on Sep. 2, 2010, provisional application No. 61/452,922, filed on Mar. 15, 2011.

(51) Int. Cl.
| | |
|---|---|
| *F16B 5/02* | (2006.01) |
| *F16B 41/00* | (2006.01) |
| *B60Q 1/26* | (2006.01) |
| *B60Q 1/04* | (2006.01) |
| *F16B 37/04* | (2006.01) |
| *F16B 21/08* | (2006.01) |

(52) U.S. Cl.
CPC ........... *B60Q 1/263* (2013.01); *B60Q 1/0441* (2013.01); *F16B 5/0216* (2013.01); *F16B 21/086* (2013.01); *F16B 37/043* (2013.01); *F16B 41/002* (2013.01); *Y10T 29/49963* (2015.01)

(58) Field of Classification Search
CPC ............................. F16B 37/043; F16B 41/002
USPC .......... 411/107, 182, 112, 999, 353
See application file for complete search history.

(56) References Cited

U.S. PATENT DOCUMENTS

| | | | |
|---|---|---|---|
| 1,158,454 A | 11/1915 | De Camp | |
| 2,571,747 A * | 10/1951 | Murphy | ................ F16B 37/044 411/107 |

(Continued)

FOREIGN PATENT DOCUMENTS

| | | |
|---|---|---|
| DE | 3148043 | 6/1983 |
| DE | 102006051599 | 5/2008 |

(Continued)

OTHER PUBLICATIONS

International Search Report for PCT/US2011/037761; dated May 24, 2011.

(Continued)

*Primary Examiner* — Flemming Saether
(74) *Attorney, Agent, or Firm* — James Joyce; Godfrey & Kahn, S.C.

(57) ABSTRACT

A locking position stud fastener is configured to position, lock, and securely hold a lamp assembly to a vehicle body. A method for installing a lamp assembly on to a vehicle body having at least one opening for receiving a fastener includes the steps of securing a first end of a stud to the lamp assembly, rotating the stud about its axis, passing the stud through the vehicle body opening, and then locking and securing the stud in the vehicle body.

2 Claims, 10 Drawing Sheets

(56) References Cited

U.S. PATENT DOCUMENTS

| | | | |
|---|---|---|---|
| 2,667,200 A * | 1/1954 | Bedford, Jr. | F16B 37/02 248/27.3 |
| 3,116,528 A | 1/1964 | Poe | |
| 3,126,935 A * | 3/1964 | Tuozzo | F16B 41/002 29/512 |
| 3,156,281 A * | 11/1964 | Demi | F16B 39/24 403/243 |
| 4,014,245 A | 3/1977 | Frye et al. | |
| 4,038,801 A * | 8/1977 | Busch | E04B 9/20 411/107 |
| 4,472,095 A | 9/1984 | Molina | |
| 4,506,419 A * | 3/1985 | Mitomi | F16B 21/02 24/289 |
| 4,916,589 A | 4/1990 | Nakamura et al. | |
| 4,921,382 A * | 5/1990 | Fries | E06B 1/60 411/107 |
| 4,947,306 A | 8/1990 | O'Shaughnessey | |
| 4,952,107 A * | 8/1990 | Dupree | F16B 5/0208 411/103 |
| 4,989,911 A | 2/1991 | Van Order | |
| 5,020,951 A * | 6/1991 | Smith | F01L 1/46 411/107 |
| 5,073,070 A | 12/1991 | Chang | |
| 5,094,579 A * | 3/1992 | Johnson | F02B 77/00 411/107 |
| 5,129,768 A | 7/1992 | Hoyle et al. | |
| 5,163,795 A | 11/1992 | Benoit | |
| 5,222,852 A | 6/1993 | Snyder | |
| 5,269,640 A | 12/1993 | Jonishi et al. | |
| 5,286,152 A | 2/1994 | Anderson | |
| 5,368,427 A | 11/1994 | Pfaffinger | |
| 5,387,065 A | 2/1995 | Sullivan | |
| 5,494,392 A | 2/1996 | Vogel et al. | |
| 5,568,675 A | 10/1996 | Asami | |
| 5,846,040 A | 12/1998 | Ueno | |
| 6,017,136 A * | 1/2000 | Burton | B60Q 1/0683 362/273 |
| 6,039,523 A | 3/2000 | Kraus | |
| 6,119,306 A | 9/2000 | Antonucci et al. | |
| 6,209,175 B1 * | 4/2001 | Gershenson | F16B 5/065 24/297 |
| 6,264,393 B1 | 7/2001 | Kraus | |
| 6,315,438 B1 * | 11/2001 | Shirai | B60Q 1/0683 362/267 |
| 6,332,697 B2 | 12/2001 | Soga et al. | |
| 6,379,093 B1 * | 4/2002 | Bondarowicz | F16B 21/18 411/353 |
| 6,394,724 B1 * | 5/2002 | Kelly | F16B 41/002 411/107 |
| 6,514,024 B2 | 2/2003 | Tsuyoshi | |
| 6,582,171 B2 * | 6/2003 | Bondarowicz | F16B 21/18 411/353 |
| 6,612,795 B2 | 9/2003 | Kirchen | |
| 6,672,791 B2 | 1/2004 | Schubring et al. | |
| 6,695,396 B1 | 2/2004 | Schwab | |
| 6,871,431 B2 * | 3/2005 | Schmidt | B60R 13/105 40/200 |
| 6,984,096 B2 | 1/2006 | Kraus | |
| 7,033,121 B2 | 4/2006 | Kirchen | |
| 7,131,806 B2 | 11/2006 | Hansen | |
| 7,237,995 B2 | 7/2007 | Randez Perez et al. | |
| 7,462,008 B2 | 12/2008 | Attanasio | |
| 7,549,199 B2 | 6/2009 | Bugner | |
| 7,607,875 B2 | 10/2009 | Shinozaki et al. | |
| 7,677,779 B2 | 3/2010 | Schwab | |
| 7,686,555 B1 | 3/2010 | Larson et al. | |
| 7,828,502 B2 * | 11/2010 | Chretien | F16B 43/00 411/125 |
| 8,533,919 B2 | 9/2013 | Schliessner | |
| 2002/0003993 A1 | 1/2002 | Schliessner | |
| 2002/0025241 A1 * | 2/2002 | Mizuno | F16B 35/042 411/378 |
| 2002/0118549 A1 | 8/2002 | Esser et al. | |
| 2008/0141613 A1 | 6/2008 | Houck et al. | |
| 2009/0155015 A1 | 6/2009 | Parisi et al. | |
| 2009/0232617 A1 | 9/2009 | Sessa | |
| 2015/0152902 A1 * | 6/2015 | Bachman | F16B 5/0208 411/107 |

FOREIGN PATENT DOCUMENTS

| | | |
|---|---|---|
| EP | 0921323 | 6/1999 |
| WO | WO2005060331 | 7/2005 |
| WO | WO2009111620 | 9/2009 |

OTHER PUBLICATIONS

International Search Report for PCT/US2011/037760; dated Aug. 31, 2011.

European Search Report for 11787256.4; dated Oct. 2, 2014.

Office Action from the U.S. Patent and Trademark Office for U.S. Appl. No. 13/696,610; dated Dec. 1, 2014.

European Search Report for 11787255.6 dated Sep. 9, 2016.

* cited by examiner

SECTION A-A

SIX DIRECTION ALIGNMENT CONTROL

FOUR DIRECTION ALIGNMENT CONTROL

LOCKING POSITION STUD FASTENER FOR A VEHICLE LAMP ASSEMBLY

CROSS-REFERENCE TO RELATED APPLICATIONS

This application is continuation in part of International Application Number PCT/US2011/037760, filed on May 24, 2011, which entered the United States as U.S. application Ser. No. 13/696,610 on Nov. 7, 2012, and which is based on and claims priority from U.S. Provisional Patent Application Ser. No. 61/347,668, filed on May 24, 2010, U.S. Provisional Patent Application Ser. No. 61/379,613, filed on Sep. 2, 2010 and U.S. Provisional Patent Application Ser. No. 61/452,922, filed on Mar. 15, 2011, all of which are incorporated herein by reference for all purposes.

FIELD OF THE INVENTION

The present invention relates generally to fasteners for vehicle lamp assemblies. In particular, the present invention relates to a fastener for a lamp assembly that allows the lamp assembly to be accurately positioned when mounting on a vehicle.

BACKGROUND

Exterior lamp structures are typically a molded plastic housing. Lamps vary in shape and size but all need to be securely attached and require features that aid alignment with the vehicle body to eliminate uneven or excessive gaps around the perimeter of the lamp. The vehicle body is typically a sheet metal structure with a pocket shaped to match that of the lamp structure for aerodynamics and styling.

When a lamp structure is inserted and securely attached to the vehicle body, it is highly desirable to have a precise and uniform fit around the perimeter of the lamp within the vehicle body pocket. Inside the vehicle body pocket are holes that are sized, shaped and positioned to receive studs, grommets or posts extending from the lamp structure for both alignment and secure attachment. If the sheet metal hole passes into an interior area of the vehicle, such as the trunk of a car, a gasket seal is typically used around the perimeter hole to prevent water or fumes from passing through the hole.

Examples of exterior vehicle lamp structures include but are not limited to head lamps, fog lamps, center high mounted stop lights and lamp assemblies. Exterior lamps often include multiple light functions. For instance, a lamp assembly often includes running, turn signal and backup lights in addition to the stop light.

Regardless of the type of exterior lamp arrangement, it is important to control lamp alignment with the vehicle body and have it well secured. Lamp alignment needs to be controlled with the vehicle body in all six directions in order to achieve a precise and uniform fit around the perimeter of the lamp structure. The six directions of lamp structure alignment that are needed with the vehicle body are right to left, up and down and fore and aft. Typically a combination of at least one alignment pin and at least one threaded grommet or threaded stud is used to both align and securely attach the lamp structure to the vehicle.

The efficiency of a vehicle assembly plant is a driving force behind product design since each assembly station is critically time dependent so not to be the bottle neck in the chain process. Eliminating the need to drive studs or nuts on the vehicle assembly line is highly desirable especially if the stud or nut is in a difficult to reach area inside the vehicle body with a stud or nut driver.

SUMMARY OF THE INVENTION

Disclosed is a fastener and a method for installing a lamp assembly on to a vehicle body having at least one opening for receiving the fastener, the method comprising the steps of securing a first end of a stud to a lamp assembly, the stud also having a second flared outward end, then passing the stud through the vehicle body opening, securing the stud in the vehicle body. In one embodiment, the fastener is adapted to be engaged by a tool to release the fastener from the vehicle body.

The disclosed locking position stud fastener greatly eases assembly when an exterior vehicle lamp structure is first attached to a vehicle body at the assembly line. The locking position stud fastener allows a lamp structure to be first assembled to a vehicle body without the need to drive a stud or nut.

While one possible application of the present invention is in connection with a vehicle lamp assembly such as a lamp assembly, many other applications are possible and references to use in connection with a vehicle lamp assembly or lamp assembly should not be deemed to limit the uses of the present invention. The terms used herein should not be interpreted as being limited to specific forms, shapes, or compositions. Rather, the parts may have a wide variety of shapes and forms and may be composed of a wide variety of materials.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 5A illustrates the use of an orienting slot on the grommet and a rib on the vehicle body boss.

DETAILED DESCRIPTION

Figure 1:
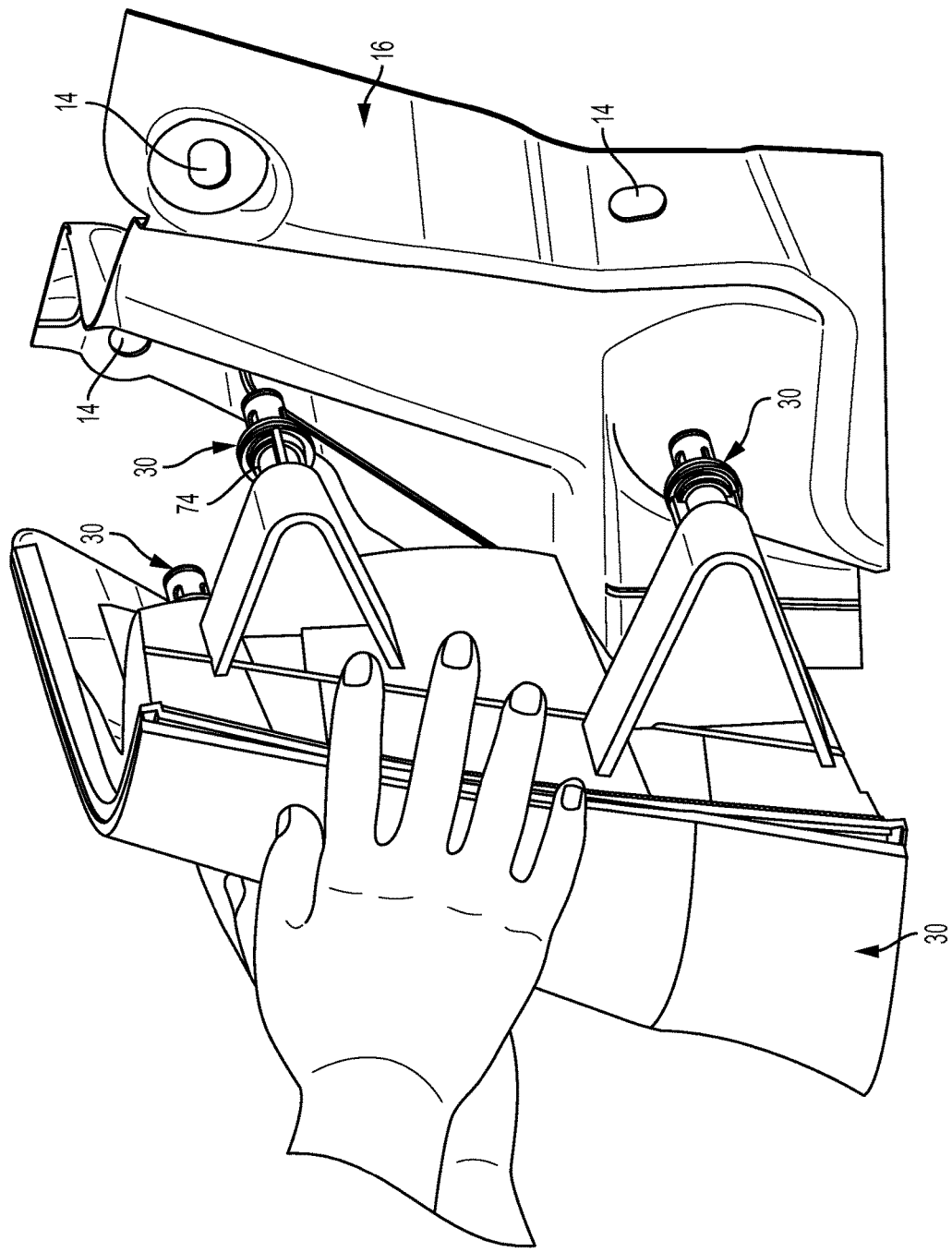
FIG. 1 is a perspective view of a lamp assembly about to be assembled to a vehicle body with the use of a fastener according to this disclosure.
Figure 2:
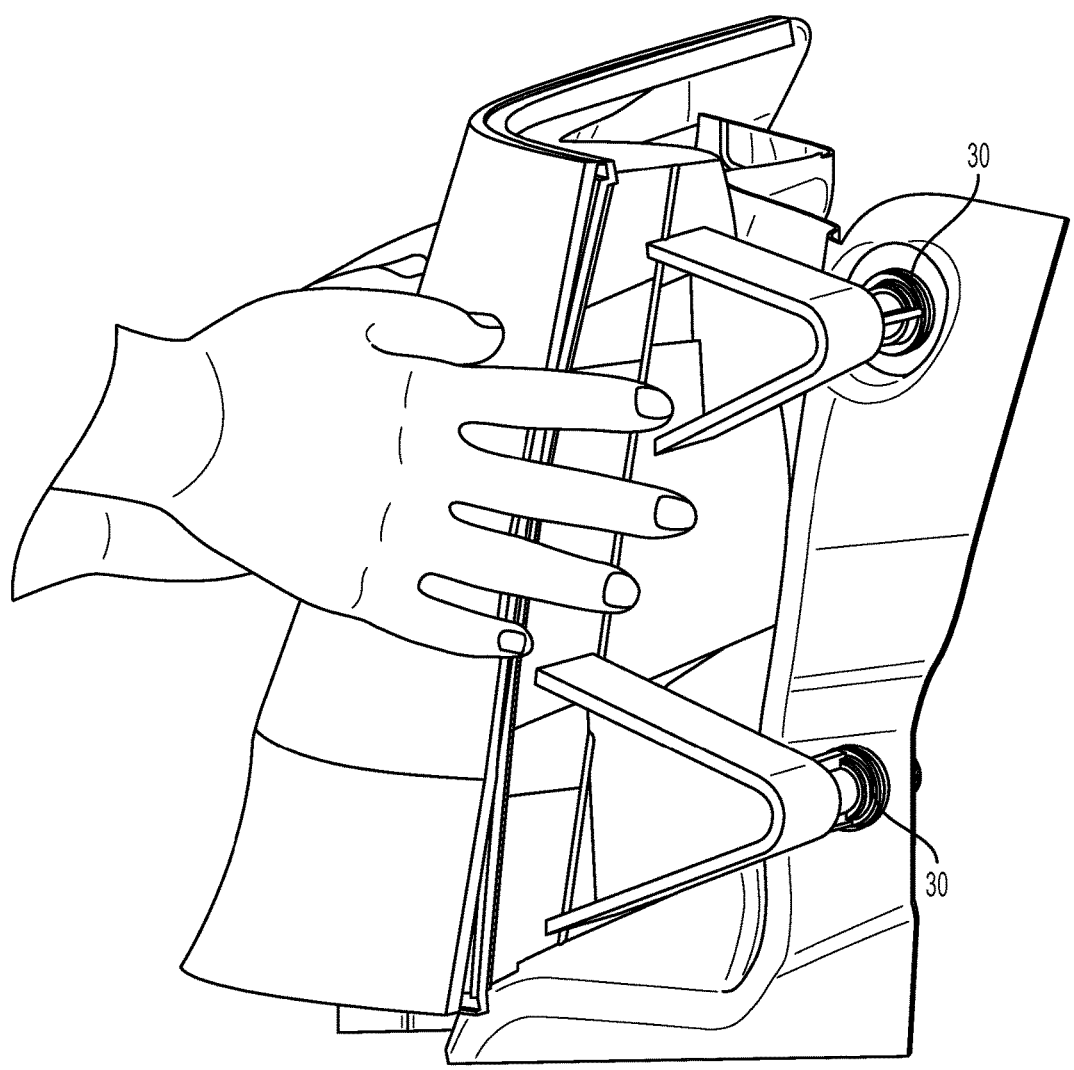
FIG. 2 is a perspective view of the lamp assembly of FIG. 1 after the lamp assembly has been attached to the vehicle body.
Figure 3:
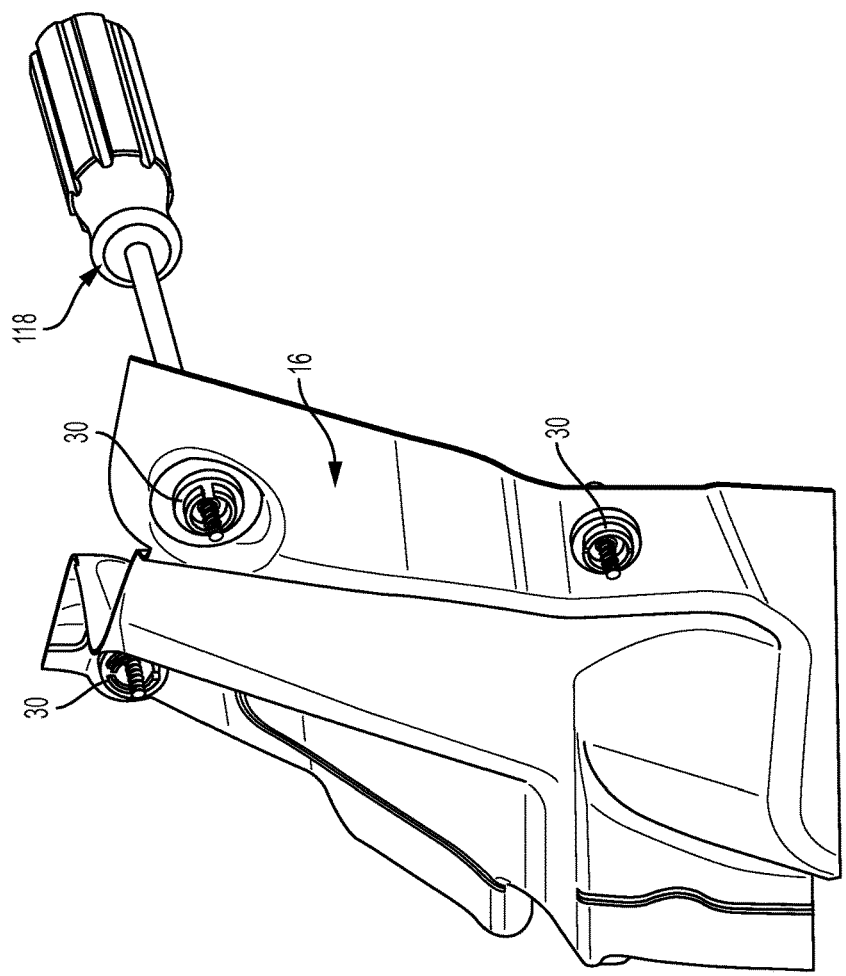
FIG. 3 is a perspective view of the lamp assembly removed from the vehicle body after a stud in the fastener has been released from the lamp assembly.
Figure 3:
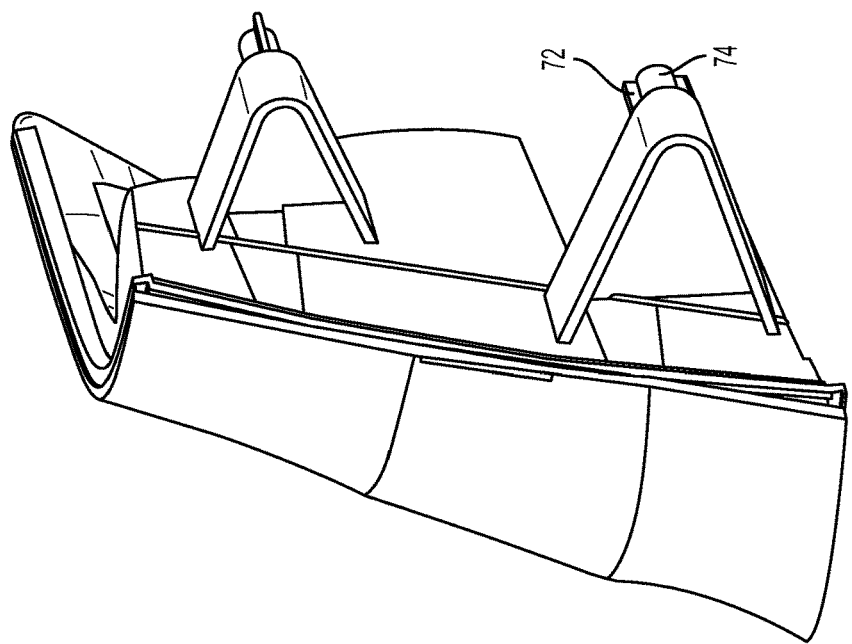

In FIGS. 1-3, three lamp assembly fasteners 30 according to one embodiment of the present invention are shown on a lamp assembly 10, each interacting with a hole 14 in a vehicle sheet metal 16, in place of guide pins or a bulbous grommet as is typically used in the prior art.

More particularly, as shown especially in FIGS. 1, 2 and 5-5B, disclosed is a device and method for installing a lamp assembly 10 on to a vehicle body 16 having at least one opening 14 for receiving the fastener 30, the method comprising the steps of: securing a first end 108 of a stud 110 to the lamp assembly 10, the stud 110 also having a second flared outward end 114 with an impression 115 (see FIG. 10) adapted to be engaged by a tool 118 (see FIG. 3) in order to rotate the stud 110 about its elongated axis, then passing the stud 110 through the vehicle body opening 14, and securing the stud 110 in the vehicle body 16. As shown in FIG. 1, the shape of the openings 14 in the vehicle body 16 can be circular, oblong/slotted or rectangular. The various opening shapes assist in the positioning and alignment of the lamp assembly 10 relative to the vehicle body 16.

More particularly, the fastener 30 comprises a grommet 32 adapted to be secured to the vehicle body 16, and the stud 110, the stud being received by the grommet 32. A stud, as used herein, is an elongated member having an elongated axis. The stud 110 is preferably made from metal, but in other embodiments, other materials, such as plastic, can be used. A flared outward end, as used herein, means an end portion of an elongated member where the radial diameter is greater than in an area adjacent the flared outward end.

In the illustrated embodiments, the stud first end 108 is adapted to be attached to the lamp assembly 10 by threads 132 that engage a tubular boss 74 on the lamp assembly 10. In other embodiments (not shown), any other conventional method of attaching the stud 110 to the lamp assembly 10 can be used.

Figure 4B:
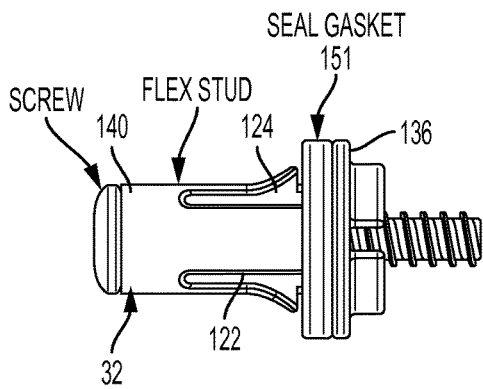
FIG. 4B is a side view of the fastener of FIG. 4.
Figure 4C:
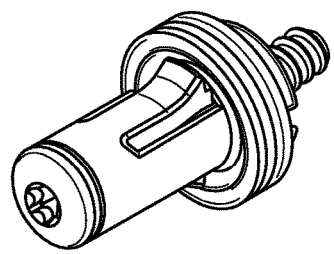
FIG. 4C is a perspective view of the fastener of FIG. 4.
Figure 4D:
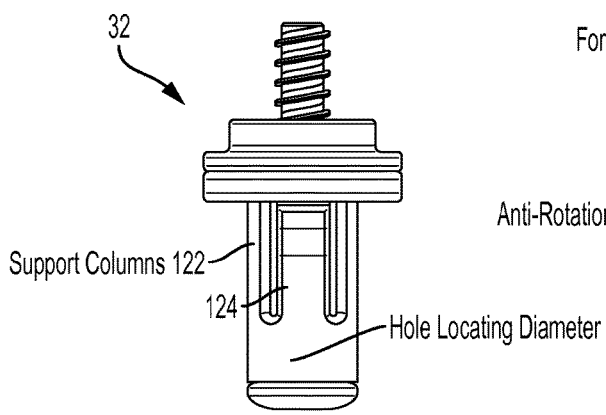
FIG. 4D is a top view of the fastener of FIG. 4.
Figure 4E:
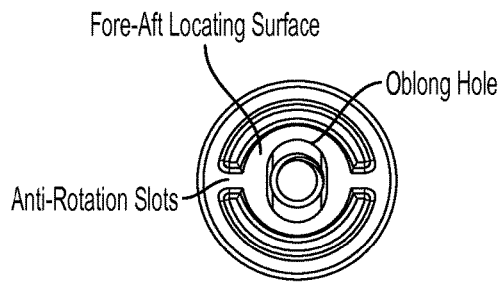
FIG. 4E is a rear view of the fastener of FIG. 4.
Figure 5:
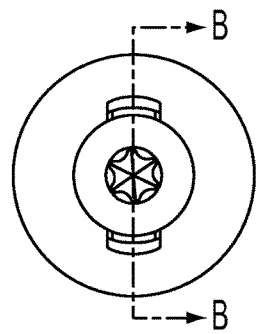
FIG. 5 is a front view of the locking position fastener of FIG. 4 when secured to a portion of a vehicle body.
Figure 9:
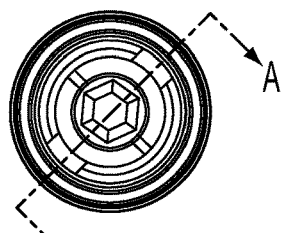
FIG. 9 is a front view of another embodiment of a fastener according to this disclosure.
Figure 9A:
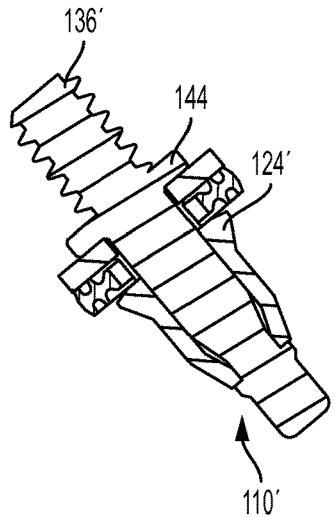
FIG. 9A is a cross section of the fastener taken along the line A-A in FIG. 9.
Figure 9B:
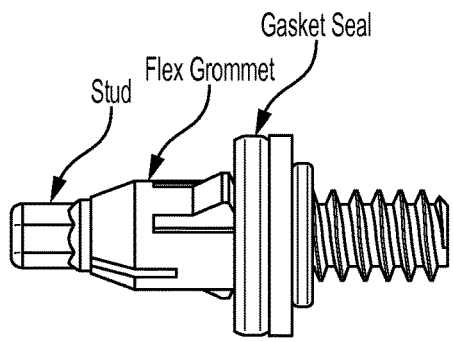
FIG. 9B is a side view of the fastener of FIG. 9.
Figure 9C:
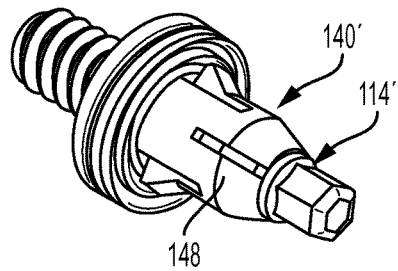
FIG. 9C is a perspective view of the fastener of FIG. 9.
Figure 9D:
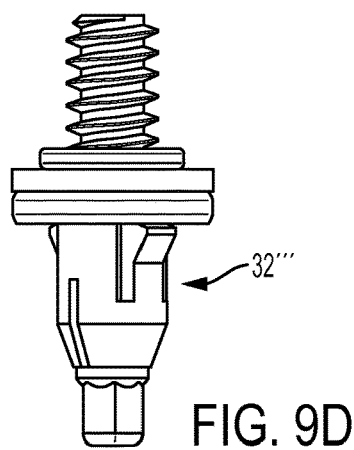
FIG. 9D is a top view of the fastener of FIG. 9.

In the illustrated embodiments, the grommet 32 is made from plastic and is adapted to be secured to the vehicle body 16 by the grommet having spaced apart support columns 122 and retaining fingers 124 (see FIGS. 4B-4D), the retaining fingers 124 moving radially inwardly when the grommet 32 passes through the opening 14 in the vehicle body, and then expanding the retaining fingers 124 outwardly after passing through the opening 14 in the vehicle body. In other embodiments (not shown), other means of retaining the grommet 32 within the vehicle body opening can be used. For example, in another embodiment of the grommet 32''' as shown in FIG. 9-9D, the grommet 32''' could be threaded and studed into the sheet metal (not shown in FIG. 9) prior to the stud 110' being inserted into the grommet. As shown in FIG. 5, the grommet 32 also includes a bore 128 adapted to receive the stud 110. The bore 128 can be either cylindrical or tapered.

More particularly, the grommet 32 includes a first end 136 adapted to engage the vehicle body 16, the first end 136 being spaced apart from the retaining fingers 124. And the stud 110 is fixed relative to the grommet 32 by the flared outward end 114 engaging another end 140 of the grommet 32.

Figure 9E:
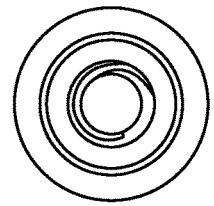
FIG. 9E is a rear view of the fastener of FIG. 9.

In one embodiment, as shown in FIGS. 9-9E, a stud 110' is also fixed relative to the grommet 32''' by the stud 110' having a flange 144 between the retaining fingers 124' and the stud first end 136'. The flange 144 is a adapted to engage the sheet metal 16.

In this embodiment, the grommet 32''' further includes the other end 140 having expansion slots 148 that permit the stud flared outward end 114 to pass through the bore 128 and along the expansion slots 148 to the other end 140' of the stud 110'. After passing through the expansion slots 148, the arms forming the slots 148 flex back to along the stud 110' so that the stud other end 140' engages and holds the stud flared end 114', as shown in FIG. 9A.

Figure 5A:
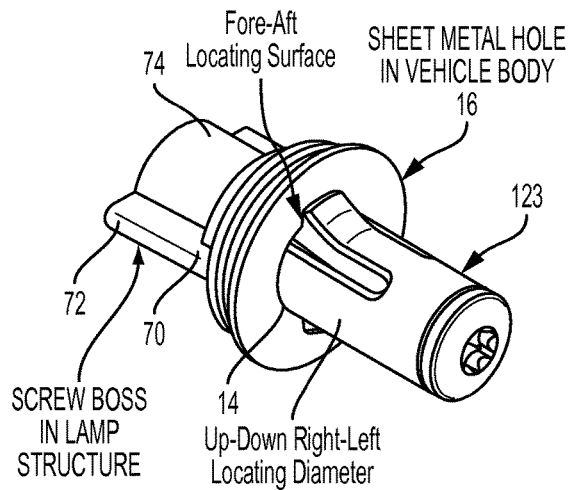
FIG. 5A is a perspective view of the fastener of FIG. 5.
Figure 5B:
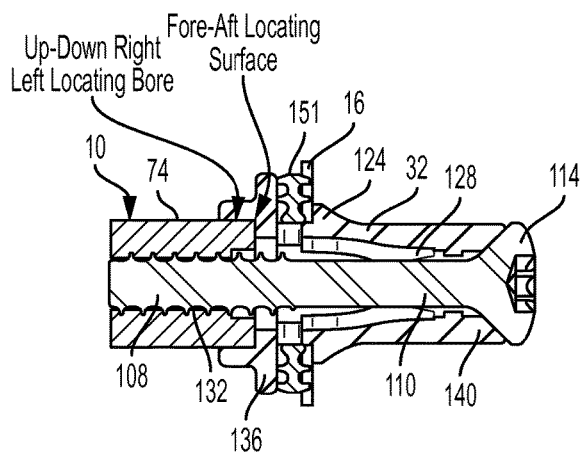
FIG. 5B is a cross section of the fastener taken along the line B-B in FIG. 5.
Figure 5C:
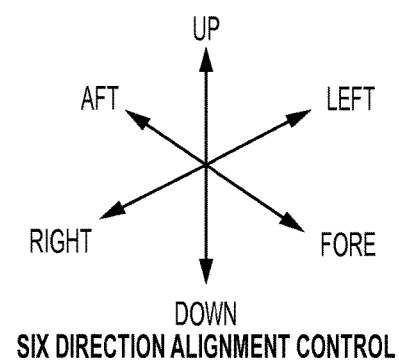
FIG. 5C shows the six directions of alignment control of the fastener.
Figure 8:
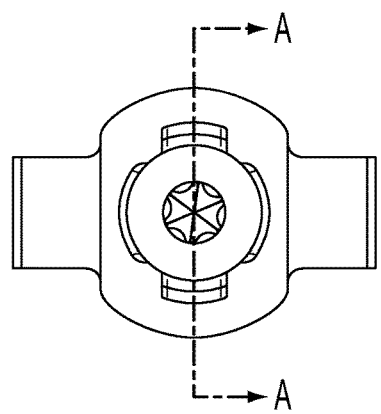
FIG. 8 is a front view of another embodiment of a fastener according to this disclosure.
Figure 8A:
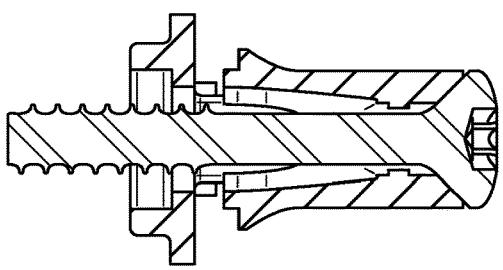
FIG. 8A is a cross section of the fastener taken along the line A-A in FIG. 8.
Figure 8B:
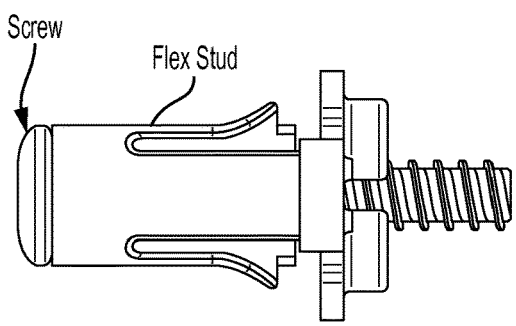
FIG. 8B is a side view of the fastener of FIG. 8.

In most of the disclosed embodiments, the fastener 30 further includes resilient means adjacent the grommet first end 136 adapted to be positioned between the grommet first end 136 and the vehicle body 16 for causing snug engagement between the grommet 32 and the vehicle body 16 (see FIG. 5B). In this embodiment, the resilient means is a rubber gasket 151. In another embodiment, as shown in FIG. 8D, the grommet 32" includes resilient means on the form of radially extending arced flexible fingers 152 attached to the grommet first end 108'.

A preferred arrangement is to mount the grommet 32 to the lamp assembly 10 so that the positioning fingers 38 are oriented properly to engage the sides of the slotted hole. (See FIG. 1.) Orienting can be aided using an orientation feature such as a slot 70 on the grommet 32 and a rib 72 on the lamp assembly 10 or boss 74, as shown in FIG. 5A.

Figure 8C:
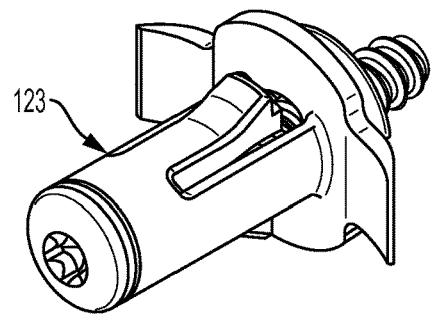
FIG. 8C is a perspective view of the fastener of FIG. 8.
Figure 8D:
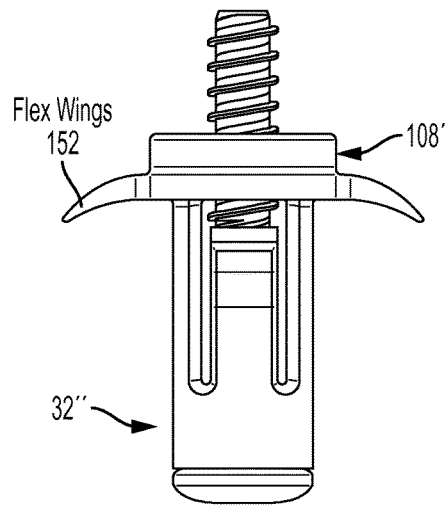
FIG. 8D is a top view of the fastener of FIG. 8.

In one embodiment, as shown for example in FIG. 8C, a portion 123 of the grommet 32 is cylindrical. This shape aids in the locating of the grommet 32 in a round sheet metal hole 14.

Figure 6:
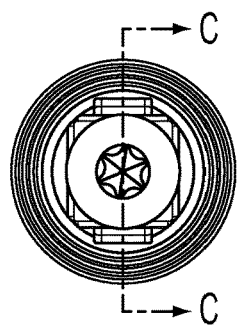
FIG. 6 is a front view of another embodiment of a fastener according to this disclosure.
Figure 6A:
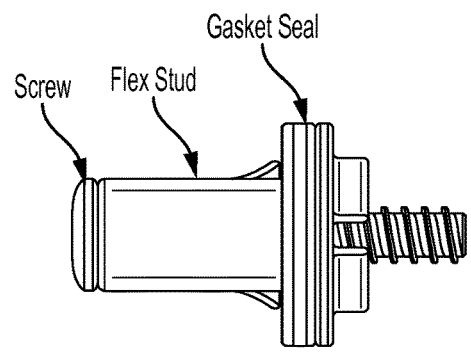
FIG. 6A is a side view of the fastener of FIG. 6.
Figure 6B:
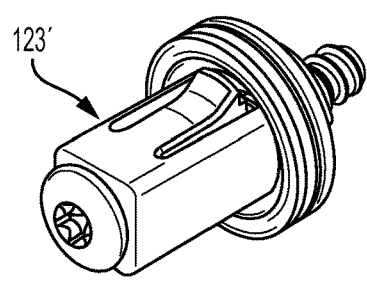
FIG. 6B is a perspective view of the fastener of FIG. 6.
Figure 6C:
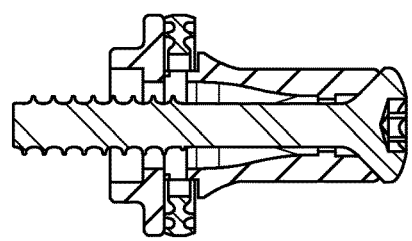
FIG. 6C is a cross section of the fastener taken along the line C-C in FIG. 6.
Figure 6D:
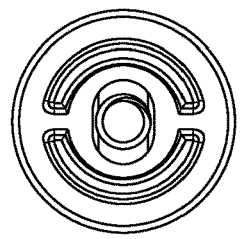
FIG. 6D is a rear view of the fastener of FIG. 6.
Figure 6E:
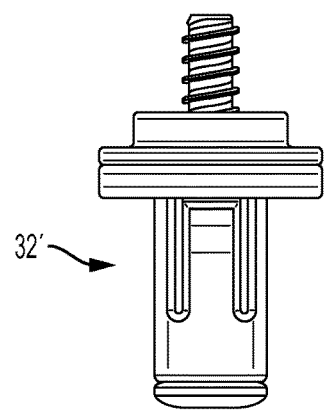
FIG. 6E is a top view of the fastener of FIG. 6.
Figure 7:
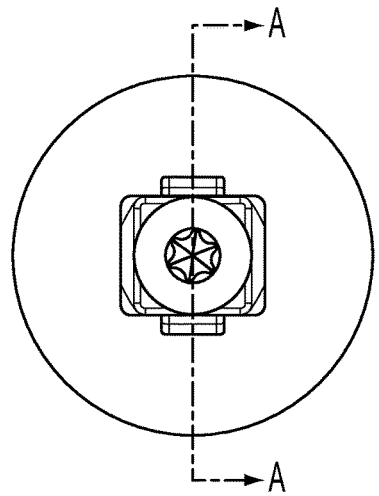
FIG. 7 is a front view of the locking position fastener of FIG. 6 when secured to a portion of a vehicle body.
Figure 7A:
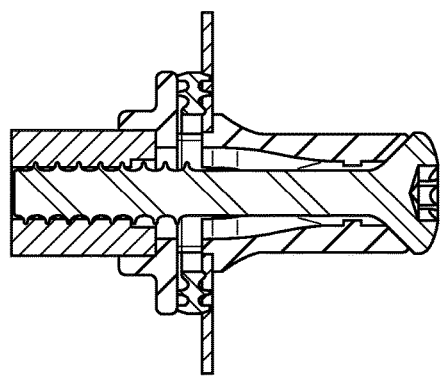
FIG. 7A is a cross section of the fastener taken along the line A-A in FIG. 7.
Figure 7B:
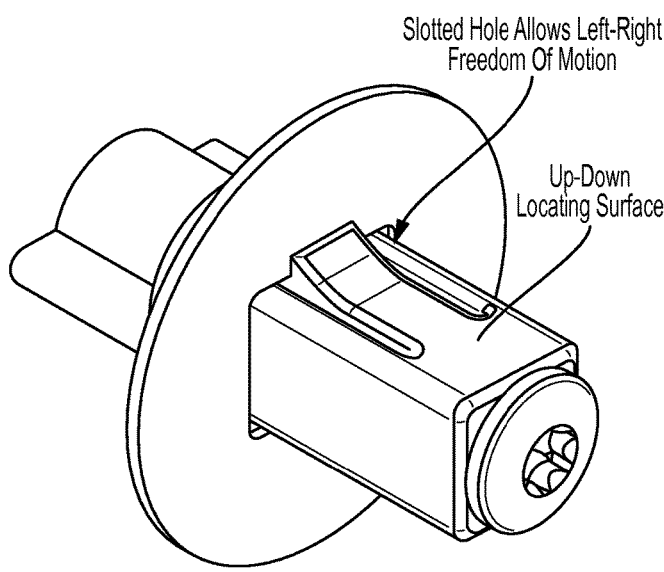
FIG. 7B is a perspective view of the fastener of FIG. 7.
Figure 7C:
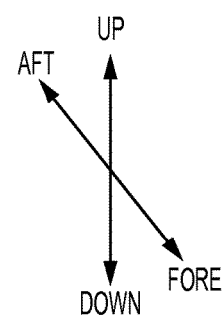
FIG. 7C shows the four directions of alignment control of the fastener.

In another embodiment, as shown in FIG. 6B, a portion 123' of the grommet is box shaped. This aids in the locating of the grommet 32 in a rectangular sheet metal hole 14', as shown in FIG. 7. Using a rectangular hole 14' provides additional alignment control over that provided by a round hole.

As the stud tool end 114 passes through the sheet metal 16, with the stud 110 at least partially received in the grommet 32, a combination of expanding and contracting of the grommet 32 occurs to hold the stud 110 in position relative to the sheet metal 16.

In one embodiment, as shown in FIGS. 1-8, the method further includes placing the grommet 32 around the stud 110, and then passing the so assembled fastener 30 through the sheet metal 16, where the retaining fingers 124 first collapse so the fastener 30 can fit through the hole 14, until the fingers 124 pass completely through the sheet metal 16, where the fingers 124 flex back outward so the fastener 30 is now held in the sheet metal 16.

In another embodiment, as shown in FIG. 9, the method includes first passing the grommet 32''' through a vehicle body opening 14, and then passing the stud 110' through the grommet 32'''. This is especially useful where preinstalling grommets is necessary because of limited space between the lamp assembly and the vehicle body.

As shown in FIG. 3, the lamp assembly 10 can be detached from the vehicle sheet metal 16 without damaging the fasteners 30, simply by removing the mounting studs 110.

Figure 10:
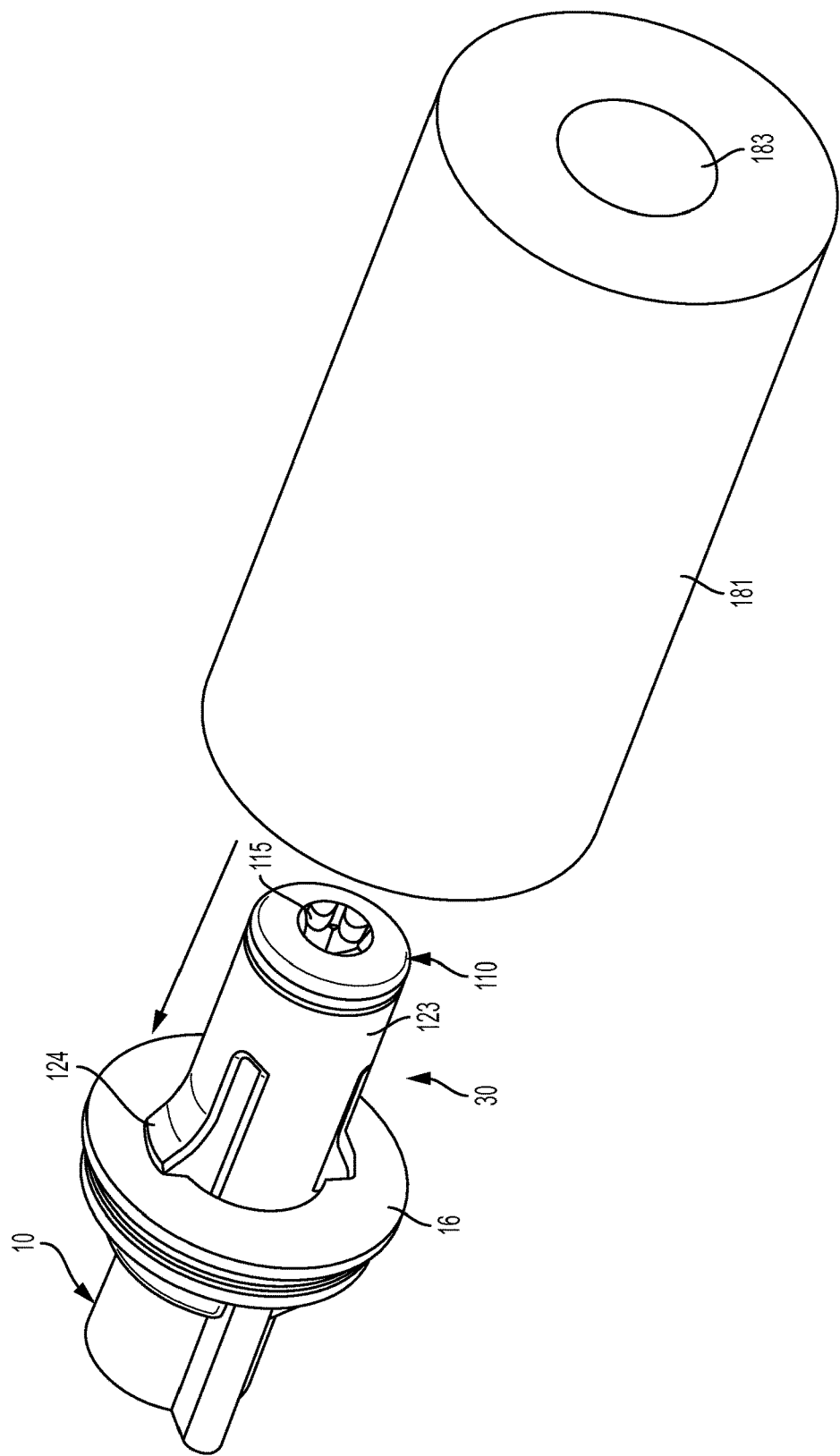
FIG. 10 is a perspective view of the fastener of FIG. 4 shown with a cylindrical tool for releasing the fastener from a vehicle body.

FIG. 10 illustrates an alternative method for releasing the fastener 30 from the vehicle body 16. In this instance, a tool in the form of a short cylinder 181 is provided, the central bore 183 of the cylinder 181 being sized so that the cylinder central bore 183 is only slightly larger than the outside diameter of the grommet cylindrical portion 123. The cylinder 181 is slid over the fastener 30 to cause the retaining fingers 124 to be bent down toward the stud 110. As a result, the retaining fingers 124 and the grommet 32 can now pass back out through the vehicle body 16, releasing the lamp assembly 10 from the vehicle body 16. If there is no need to release the fastener 30 from the lamp assembly 10, the stud flared second end 114 need not be adapted to be engaged by a tool in order to rotate the stud 110 about its elongated axis, the flared second end (not shown) having a surface without the impression 115.

As shown in FIG. 1, the locking position stud fastener 30 is fastened to the lamp assembly 10 that is ready to be attached to the vehicle body 16. This example shows a lamp assembly with three locking position stud fasteners and a vehicle body structure that includes a combination of circular and slotted holes to control alignment of the lamp structure when it is being attached to a vehicle.

The locking position stud fastener provides a secure lamp attachment, lamp removal, and alignment of the lamp to the vehicle body. The locking position stud fastener also eliminates the use of stud or nut driving equipment to attach the lamp to the vehicle during first assembly performed at the assembly plant.

FIG. 2 shows the lamp structure pushed into place on the vehicle body and securely attached. Each locking position stud fastener is locked into its respective hole in the vehicle body with a single push on the lamp structure. The time and cost to attach the lamp is drastically reduced as well as any risk of an assembly bottle neck since no stud or nut needs to be attached.

As shown in FIG. 3, the lamp assembly may be removed as normal with a stud driver for bulb replacement or other maintenance later. However, in this instance the locking position stud fastener remains locked to the vehicle body. When the lamp assembly needs to be reattached the stud bosses are inserted back into the locking position stud fastener and the studs are fastened back into their stud bosses.

Figure 4:
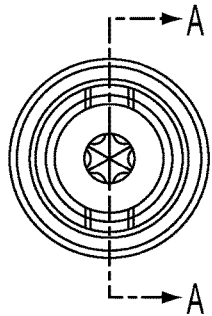
FIG. 4 is a front view of a locking position fastener according to this disclosure.
Figure 4A:
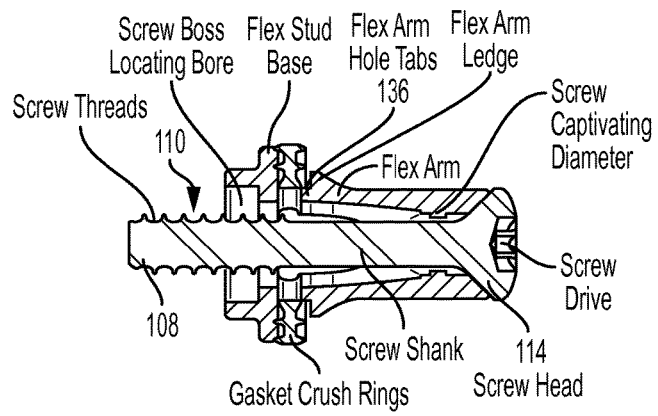
FIG. 4A is a cross section of the fastener taken along the line A-A in FIG. 4.

FIG. 4 shows different views and features of the locking position stud fastener. The cross section view shows the locking fingers the flex inward when inserted through a hole then snap back to engage.

FIG. 5 shows different views of the locking position stud fastener including a portion of a lamp structure stud boss and a circular hole in the vehicle body sheet metal. Also shown are the features that control alignment between the lamp structure and vehicle body in all six directions. The circular hole controls up-down and right-left while the retaining fingers in combination with the spring like compression from the gasket seal controls fore-aft alignment FIG. 6 shows a square body locking position stud fastener intended for use with a square or rectangular hole in the vehicle body.

FIG. 7 shows different views of the square body locking position stud fastener including a portion of a lamp structure stud boss and a rectangular shaped slotted hole in the vehicle body sheet metal. Also shown are the features that control alignment between the lamp structure and vehicle body in four directions leaving freedom of motion in the slotted direction. This arrangement is typically used to prevent binding with a circular hole.

FIG. 8 shows an alternate arrangement that uses flex wings in place of a gasket seal for spring like compression in the event a seal is not needed.

FIG. 9 shows an alternate embodiment of a collar grommet and flex grommet. In this case the single grommet is fastened to the lamp and the flex grommet and gasket seal are inserted in the vehicle body. With these in place the lamp structure can be assembled to the vehicle body with one push as previously described. The lamp may be removed and reattached by screwing or unscrewing the collar grommet which would remain locked to the flex grommet after first installation.

The locking position stud fastener provides a lamp assembly fastener and fastening method that is cost-effective, easy to assemble, provides improved functionality, and eliminates certain of the deficiencies inherent in existing designs.

Many different materials can be used for the various components of the present invention, including metals, composites and plastics. It has been found cost effective to manufacture the majority of the components out of injection-molded plastic or plastic composite materials.

The fastener of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A fastener for connecting a lamp assembly to a vehicle body, the fastener comprising:
a grommet having a grommet first end and a grommet second end, with a bore extending therebetween, wherein the grommet is securable in direct contact with a vehicle body at least partially via grommet retaining fingers, the retaining fingers moving radially inwardly when the grommet passes through an opening in the vehicle body, and then expanding after passing through the opening in the vehicle body, and wherein the grommet further includes longitudinally extending support columns spaced between the retaining fingers; and a stud extending through the bore and having a stud first end threadingly engageable with a lamp assembly, and a stud second end engageable with the grommet second end, wherein the stud second end flares outwardly as it extends in a direction away from the stud first end and further extends at least partially outside the bore at the grommet second end, and wherein the stud second end has an outer diameter that does not exceed an outer diameter of the retaining fingers when expanded, and wherein the stud is free to rotate relative to the grommet and axial movement of the stud second end in one direction is substantially prevented by engagement of the stud second end with the grommet second end.

2. A fastener for connecting a lamp assembly to a vehicle body, the fastener comprising:

a grommet having a bore extending therethrough, wherein the grommet is securable in direct contact with a vehicle body via grommet retaining fingers, the retaining fingers moving radially inwardly when the grommet passes through an opening in the vehicle body, and then expanding after passing through the opening in the vehicle body, the grommet further including longitudinally extending support columns situated between the retaining fingers; and a stud extending through the bore and having a stud first end threadingly engageable with a lamp assembly, and a stud second end engageable with an end of the grommet wherein the stud second end flares outwardly as it extends in a direction away from the stud first end and further extends at least partially outside the bore at the end of the grommet and wherein the bore expands conically adjacent to the stud second end, and wherein the stud is free to rotate relative to the grommet and axial movement of the stud second end in a first direction is substantially prevented by engagement of the stud second end with the end of the grommet.

* * * * *